(12) United States Patent
Dunphy et al.

(10) Patent No.: US 7,447,390 B2
(45) Date of Patent: Nov. 4, 2008

(54) PRESSURE TRANSDUCER WITH OPTICAL WAVEGUIDE FEEDTHROUGH ASSEMBLY

(75) Inventors: James R. Dunphy, South Glastonbury, CT (US); John J. Sgambelluri, Meriden, CT (US); John Grunbeck, Northford, CT (US); George Talmadge, Clinton, CT (US); Robert F. Robinson, Middletown, CT (US); James M. Sullivan, East Hampton, CT (US); Joseph F. Robbins, Monson, MA (US)

(73) Assignee: Weatherford/Lamb, Inc., Houston, TX (US)

( * ) Notice: Subject to any disclaimer, the term of this patent is extended or adjusted under 35 U.S.C. 154(b) by 126 days.

(21) Appl. No.: 11/172,617

(22) Filed: Jun. 30, 2005

(65) Prior Publication Data

US 2007/0003207 A1 Jan. 4, 2007

(51) Int. Cl.
*G02B 6/00* (2006.01)
(52) U.S. Cl. .......................... 385/12; 385/134; 385/138
(58) Field of Classification Search .................... 385/12
See application file for complete search history.

(56) References Cited

U.S. PATENT DOCUMENTS

| | | | |
|---|---|---|---|
| 4,682,846 A * | 7/1987 | Cowen ........................ 385/138 |
| 5,024,503 A | 6/1991 | Gunn et al. | |
| 5,337,612 A | 8/1994 | Evans | |
| 6,009,216 A | 12/1999 | Pruett et al. | |
| 6,439,055 B1 * | 8/2002 | Maron et al. ................. 73/705 |
| 6,445,868 B1 * | 9/2002 | Grunbeck et al. ........... 385/138 |
| 6,526,212 B1 | 2/2003 | Mishriky et al. | |
| 2002/0009252 A1 * | 1/2002 | Maron et al. ................... 385/12 |
| 2002/0172446 A1 * | 11/2002 | Fernald et al. ................ 385/12 |
| 2004/0165809 A1 * | 8/2004 | Kersey et al. ................. 385/12 |
| 2004/0165834 A1 | 8/2004 | Bryant et al. | |
| 2004/0165841 A1 | 8/2004 | Fernald et al. | |
| 2007/0003206 A1 | 1/2007 | Dunphy et al. | |

FOREIGN PATENT DOCUMENTS

EP 0316473 A1 5/1989
GB 2 411 005 8/2005

OTHER PUBLICATIONS

GB Search Report, Application No. 0611021.7, dated Sep. 27, 2006.
* cited by examiner

*Primary Examiner*—Frank G Font
*Assistant Examiner*—Mary A El Shammaa
(74) *Attorney, Agent, or Firm*—Patterson & Sheridan, L.L.P.

(57) ABSTRACT

Optical sensors used in harsh environments require a sealed pressure tight passage of an optical waveguide into an interior of the sensor. In one embodiment, a pressure sensor assembly for determining the pressure of a fluid in a harsh environment includes a sensing element suspended within a fluid filled housing. An optical waveguide that provides communication with the sensing element couples to a feedthrough assembly, which includes a cane-based optical waveguide forming a glass plug sealingly disposed in the housing. The glass plug provides optical communication between the optical waveguide and the sensing element. A pressure transmitting device can transmit the pressure of the fluid to the fluid within the housing. The assembly can maintain the sensing element in a near zero base strain condition and can protect the sensing element from shock/vibration.

13 Claims, 13 Drawing Sheets

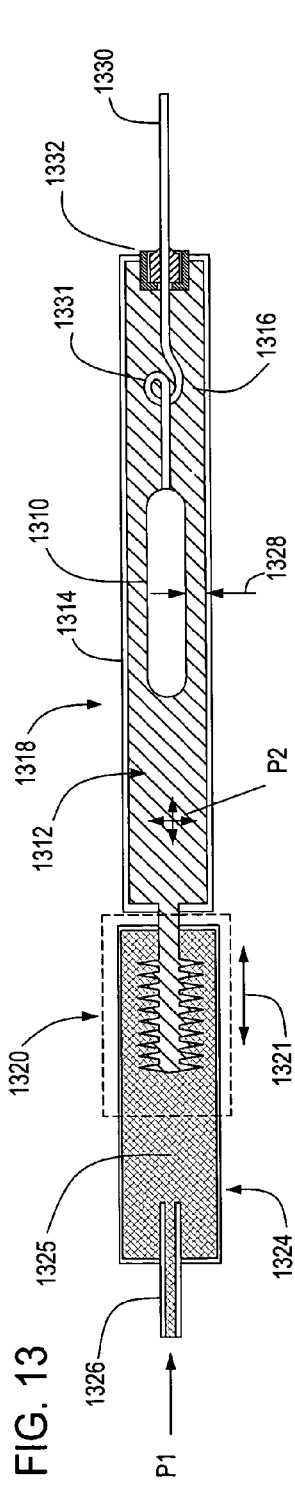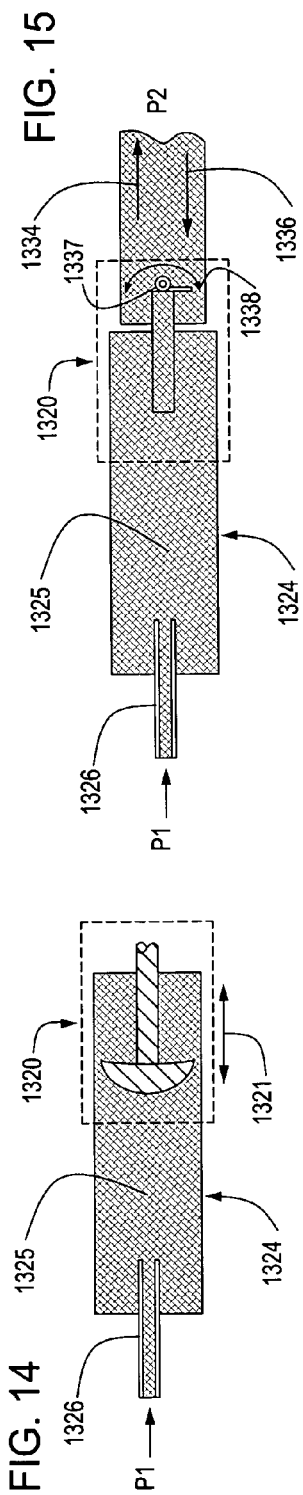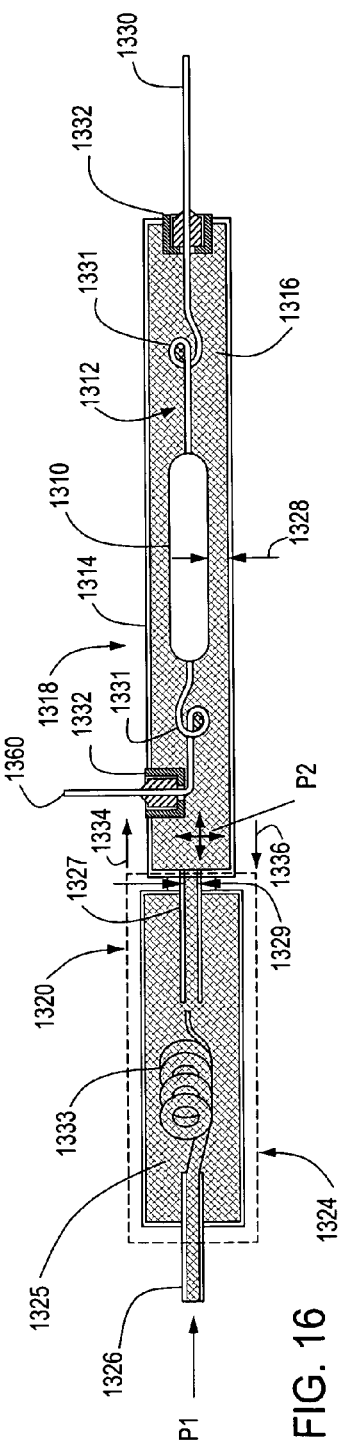
FIG. 13
FIG. 14
FIG. 15
FIG. 16

PRESSURE TRANSDUCER WITH OPTICAL WAVEGUIDE FEEDTHROUGH ASSEMBLY

CROSS REFERENCE TO RELATED APPLICATIONS

This application is related to application Ser. No. 11/172, 616, filed herewith, entitled "Optical Waveguide Feedthrough Assembly," which is herein incorporated by reference in its entirety.

BACKGROUND OF THE INVENTION

1. Field of the Invention

The invention relates to optical sensors sealed within a housing to protect the sensors from a surrounding environment. More particularly, embodiments of the invention relate to an optical pressure sensor assembly that has an optical waveguide feedthrough assembly and is for use in a harsh environment.

2. Description of the Related Art

An exemplary pressure sensor is described in U.S. Pat. No. 6,439,055, issued Aug. 27, 2002, which is hereby incorporated by reference. The pressure sensor generally includes a fiber optic sensing element suspended within a fluid filled housing. Small diameter optical waveguides penetrate the housing at a pressure seal or feedthrough member where a relatively high fluid or gas differential pressure may exist. One or both sides of the feedthrough member may be subjected to relatively high temperatures and other harsh environmental conditions, such as corrosive or volatile gas, fluids and other materials. Thus, there exists a need for an improved optical sensor assembly capable of operating in relative high temperature and high pressure environments.

SUMMARY OF THE INVENTION

Optical sensors used in harsh environments require a sealed pressure tight passage of an optical waveguide into an interior of the sensor. In one embodiment, a pressure sensor assembly for determining the pressure of a fluid in a harsh environment includes a sensing element suspended within a fluid filled housing. An optical waveguide that provides communication with the sensing element couples to a feedthrough assembly, which includes a cane-based optical waveguide forming a glass plug sealingly disposed in the housing. The glass plug provides optical communication between the optical waveguide and the sensing element. A pressure transmitting device can transmit the pressure of the fluid to the fluid within the housing. The assembly can maintain the sensing element in a near zero base strain condition and can protect the sensing element from shock/vibration.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 13 illustrates a side cross section view of a pressure sensor assembly.

FIG. 14 illustrates a side cross section view of a first alternative embodiment of a pressure transmitting device.

FIG. 15 illustrates a side view of a second alternative embodiment of a pressure transmitting device.

FIG. 16 illustrates a side cross section view of a first alternative embodiment of a pressure sensor.

DETAILED DESCRIPTION OF THE PREFERRED EMBODIMENT

Epoxy-free optical fiber feedthrough assemblies applicable for use in high temperature, high pressure environments are provided. In one embodiment, a feedthrough assembly includes a glass plug disposed in a recess of a feedthrough housing. The glass plug is preferably a large-diameter, cane-based, waveguide adapted to seal the recess in the housing and provide optical communication through the housing. All embodiments described herein provide for sealing with respect to the housing at or around the glass plug of an optical waveguide element passing through the housing.

As used herein, "optical fiber," "glass plug" and the more general term "optical waveguide" refer to any of a number of different devices that are currently known or later become known for transmitting optical signals along a desired pathway. For example, each of these terms can refer to single mode, multi-mode, birefringent, polarization maintaining, polarizing, multi-core or multi-cladding optical waveguides, or flat or planar waveguides. The optical waveguides may be made of any glass, e.g., silica, phosphate glass, or other glasses, or made of glass and plastic, or solely plastic. For high temperature applications, optical waveguides made of a glass material is desirable. Furthermore, any of the optical waveguides can be partially or completely coated with a gettering agent and/or a blocking agent (such as gold) to provide a hydrogen barrier that protects the waveguide. In addition, the feedthrough assemblies can include a single such optical waveguide or may include a plurality of such optical waveguides.

An Exemplary Feedthrough Assembly

Figure 1:
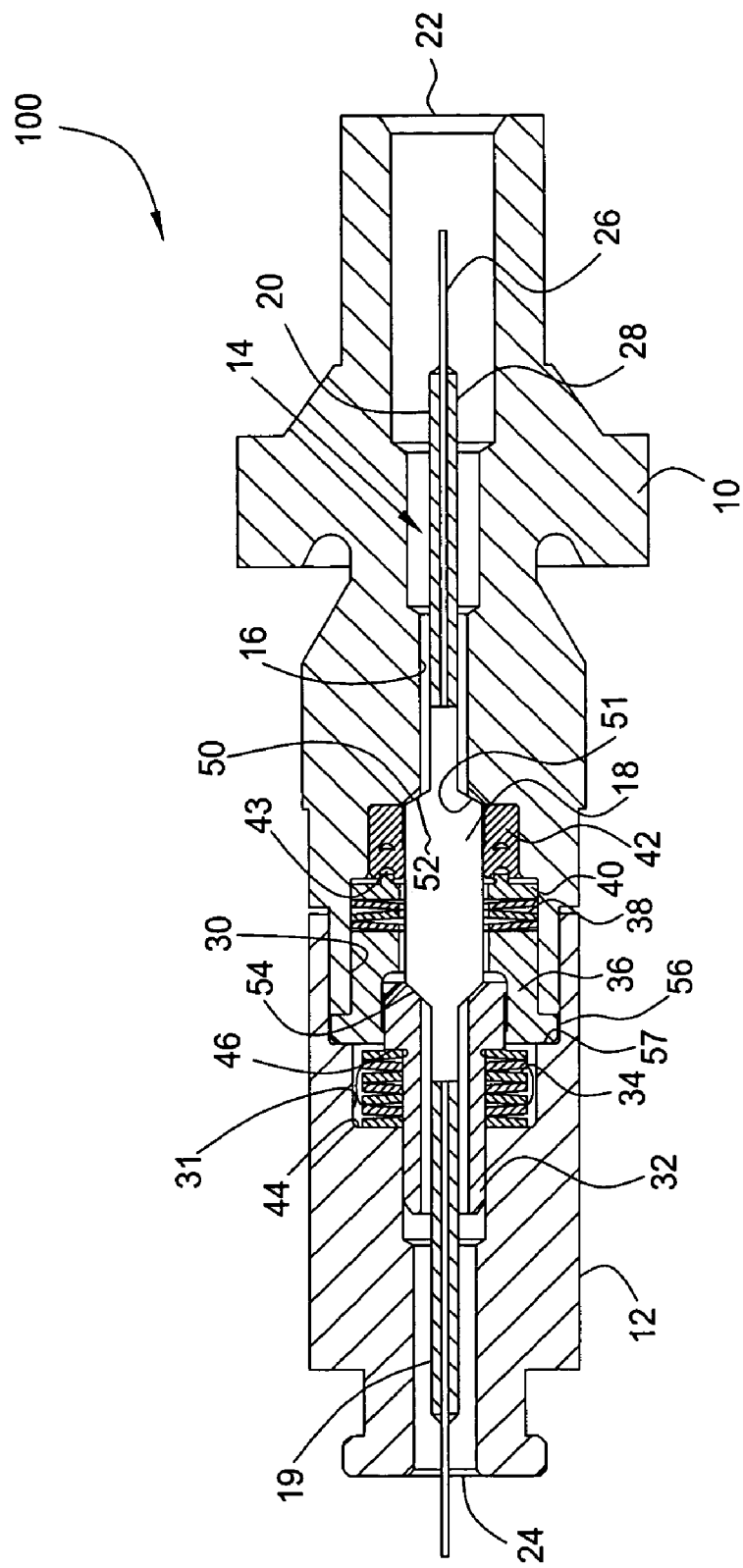
FIG. 1 illustrates a cross section view of an optical waveguide feedthrough assembly.

FIG. 1 shows a cross section view of an optical fiber feedthrough assembly 100 that includes a front housing 10 coupled to a back housing 12. An optical waveguide element 14 passes through a passageway 16 common to both housings 10, 12. The passageway 16 is defined by bores extending across the housings 10, 12. The optical waveguide element 14 includes a glass plug 18 defining a large-diameter, cane-based, optical waveguide preferably having an outer diameter of about 3 millimeters (mm) or greater. The glass plug 18 can have appropriate core and cladding dimensions and ratios to provide the desired outer large-diameter.

For some embodiments, first and second fiber pigtails 19, 20 extend from each end of the glass plug 18. Each of the pigtails 19, 20 preferably include an optical waveguide such as an optical fiber 26 encased or embedded in a carrier 28 or larger diameter glass structure allowing the fiber 26 to be optically coupled to the glass plug 18. U.S. patent application Ser. No. 10/755,722, entitled "Low-Loss Large-Diameter Pigtail" and hereby incorporated by reference in its entirety, describes exemplary pigtails that can facilitate subsequent optical connection of the fiber 26 to other fibers, connectors, or other optical components by suitable splicing techniques known in the art. Further, U.S. application Ser. No. 10/755, 708, entitled "Large Diameter Optical Waveguide Splice," which is herein incorporated by reference in its entirety, describes a large-diameter splice suitable for splicing the fiber pigtails 19, 20 to the glass plug 18. For some embodiments, the glass plug 18 can be spliced to or otherwise optically coupled with fibers in optical communication with each end of the glass plug 18 by other techniques and methods.

Sealing of the optical waveguide element 14 with respect to the front housing 10 occurs at and/or around the glass plug 18 to enable isolation of fluid pressure in communication with a first end 22 of the passageway 16 from fluid pressure in communication with a second end 24 of the passageway 16. This sealing of the glass plug 18 with respect to the front housing 10 provides the feedthrough capabilities of the feedthrough assembly 100. In the embodiment shown in FIG. 1, the glass plug 18 has a cone shaped tapered surface 50 for seating against a complimentary tapered seat 51 of the front housing 10. Engagement between the tapered surface 50 and the complimentary tapered seat 51 that is located along the passageway 16 forms a seal that seals off fluid communication through the passageway 16. The glass plug 18 can be machined to provide the cone shaped tapered surface 50. Additionally, the glass plug 18 is preferably biased against the tapered seat 51 using a mechanical preload.

A recess 30 formed in one end of the front housing 10 aligns with a corresponding recess 31 in one end of the back housing 12 where the housings 10, 12 are coupled together. Preferably, the front housing 10 is welded to the back housing 12 along mated features thereof. The housings 10, 12 preferably enclose the glass plug 18, a biasing member such as a first stack of Belleville washers 34, and a plunger 32, which are all disposed within the recesses 30, 31.

The first stack of Belleville washers 34 supply the mechanical preload by pressing the plunger 32 onto an opposite end of the glass plug 18 from the tapered surface 50. Since the plunger 32 is moveable with the glass plug 18, this pressing of the plunger 32 develops a force to bias the glass plug 18 onto the tapered seat 51 of the front housing 10 located along the passageway 16 that passes through the front housing 10.

Transfer of force from the plunger 32 to the glass plug 18 can occur directly via an interface 54 between the two, which can include mating conical surfaces. The first stack of Belleville washers 34 compress between a base shoulder 44 of the recess 31 in the back housing 12 and an outward shoulder 46 of the plunger 32 upon make-up of the front housing 10 to the back housing 12. Once the back housing 12 is welded or otherwise attached to the front housing 10 in order to keep the front and back housings 10, 12 connected, the first stack of Belleville washers 34 maintains the compression that supplies force acting against the plunger 32.

In some embodiments, the feed through assembly 100 further includes a gasket member 52 disposed between the tapered seat 51 and the tapered surface 50 of the glass plug 18. As shown in FIG. 1, the gasket member 52 comprises an annular gasket. The gasket member 52 may be a gold foil that is shaped to complement the tapered surface 50 and the tapered seat 51. The gasket member 52 deforms sufficiently to accommodate imperfections on the tapered surface 50 and/or the tapered seat 51, thereby completing the seal and reducing stress between contacting surfaces due to any imperfections on the surfaces. Gold is preferred because of its ability to withstand high temperature, its ductility and its inert, non-reactive, non-corrosive nature. However, other materials possessing these characteristics may also be suitable, including aluminum, lead, indium, polyetheretherketone ("PEEK™"), polyimide, other suitable polymers, and combinations thereof.

An additional gasket member (not shown) may be disposed between the interface 54 of the glass plug 18 and the plunger 32 for some embodiments to reduce the surface stress that may occur between these two components. In further embodiments, a layer of gold or other suitable material is deposited on the contact surfaces as an alternative to using the gasket member 52. For example, the gold may be deposited using chemical vapor deposition, physical vapor deposition, plating, or combinations thereof to reduce surface stress and maximize the seal performance. Other embodiments utilize the gasket member 52 punched from sheets of a gasket material.

For some embodiments, the housings 10, 12 additionally enclose a cup-shaped backstop sleeve 36, a second stack of Belleville washers 38, a perforated washer 40, and a centering element 42 that are all disposed within the recesses 30, 31. An outward shoulder 56 of the backstop sleeve 36 is trapped by the end of the front housing 10 and an inward shoulder 57 along the recess 31 in the back housing 12. Contact upon sandwiching of the shoulder 56 of the backstop sleeve 36 provides the point at which the housings 10, 12 are fully mated and can be secured together. Clearance is provided such that the end of the back housing 12 does not bottom out prior to the housings 10, 12 being fully mated.

The centering element 42 includes an elastomeric sealing component disposed between the glass plug 18 and the front housing 10 that can act as a back-up seal in addition to facilitating alignment of the glass plug 18 with respect to the seat 51. Although the centering element 42 is described as providing a back up seal to the tapered surface 50 of the glass plug 18 seated with the gasket member 52 on the complimentary tapered seat 51, the centering element 42 can be omitted or used independently to seal off the passageway 16 through the housings 10, 12 in other embodiments.

In some applications, the pressure in the recesses 30, 31 entering from the second end 24 of the passageway 16 is higher than the pressure entering from the first end 22 of the passageway 16. This pressure differential advantageously causes the centering element 42 to deform and press against the wall of the recess 30 and the wall of the glass plug 18, thereby creating a pressure energized seal. In some embodiments, one or more holes or annular channels 43 are formed on the outer surface of the high pressure side of the centering element 42. These holes or channels 43 facilitate the deformation of the centering element 42 and the formation of the seal between the centering element 42 and the walls of the recess 30 and the glass plug 18. Additionally, the perforated washer 40 enables pressurized fluid to fill the centering element 42 for providing the energized seal.

Preferably, force transferred through the perforated washer 40 biases the centering element 42 into the recess 30. The second stack of Belleville washers 38 pressed by the backstop sleeve 36 supplies the preloading force to the perforated washer 40. The second stack of Belleville washers 38 allow a maximum pressure force to act on the centering element 42 such that pressure of the centering element 42 against the wall of the glass plug 18 does not override force being put on the glass plug 18 to press the tapered surface 50 against the seat 51.

Embodiments of the feedthrough assembly 100 are capable of performing in temperature environments of between −50° C. and 300° C. Additionally, the feedthrough assembly 100 is capable of withstanding pressure up to about 30 kpsi.

Embedding Diagnostic Sensors

Figure 2:
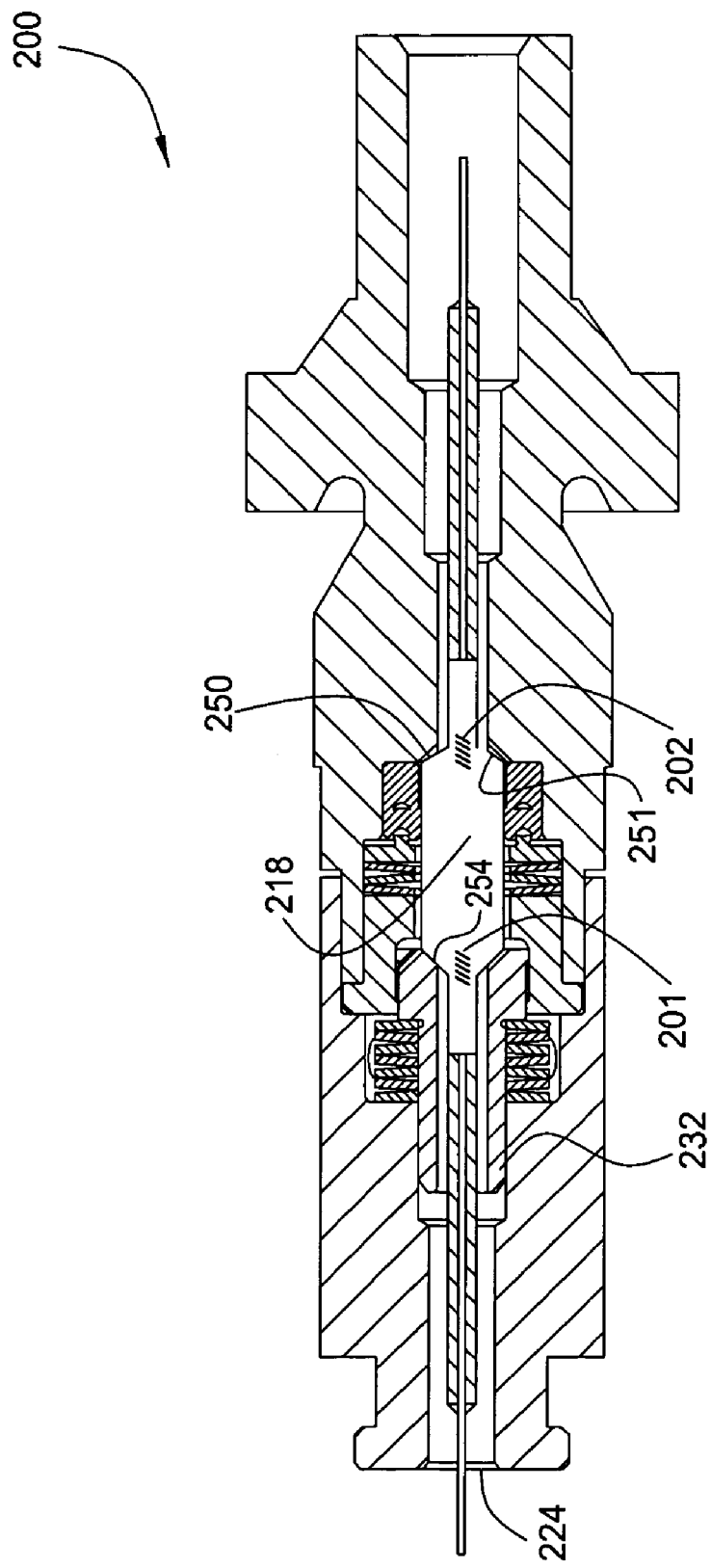
FIG. 2 illustrates a cross section view of an optical waveguide feedthrough assembly having diagnostic sensors disposed therein.

FIG. 2 illustrates a cross section view of an optical waveguide feedthrough assembly 200 that operates similar to the feedthrough assembly 100 shown in FIG. 1. However, the feedthrough assembly 200 includes first and second diagnostic sensors 201, 202 disposed within a glass plug 218. The diagnostic sensors 201, 202 can include any optical sensing element, such as fiber Bragg gratings, capable of reflecting or transmitting an optical signal in response to a parameter being measured. The first diagnostic sensor 201 is disposed within the glass plug 218 proximate an interface 254 where a plunger 232 pushes on the glass plug 218. The second diagnostic sensor 202 is disposed within the glass plug 218 proximate where a tapered surface 250 of the glass plug 218 mates with a seat 251. Preferably, each of the diagnostic sensors 201, 202 span a length of the glass plug 218 across the respective feature that the sensor is proximate.

Interpreting the signals generated by the sensors 201, 202, such as by use of a suitable algorithm or comparison to a calibration, enables monitoring of temperature and/or pressure. This detection ability allows real-time monitoring of the state of the feedthrough assembly 200. Information derived from the sensors 201, 202 can be beneficial both during fabrication of the feedthrough assembly 200 and during use thereof. For diagnostic purposes, signals received from the second sensor 202 can be monitored to identify when and/or if proper contact of the tapered surface 250 with the seat 251 occurs to ensure that sealing is established or maintained. Further, monitoring one or both the sensors 201, 202 can ensure that excess force that might break the glass plug 18 is not applied to the glass plug 18 in embodiments where the amount of force can be controlled. Monitoring signals received from the first sensor 201 can detect the presence and condition of hydrostatic loads from surrounding fluid since these hydrostatic loads dominate the response of the first sensor 201. When the feedthrough assembly 200 is part of a wellhead outlet of an oil/gas well, the sensors 201, 202 can be used to detect pressure increases and set an alarm indicating that seals have been breached in the well.

Figure 3:
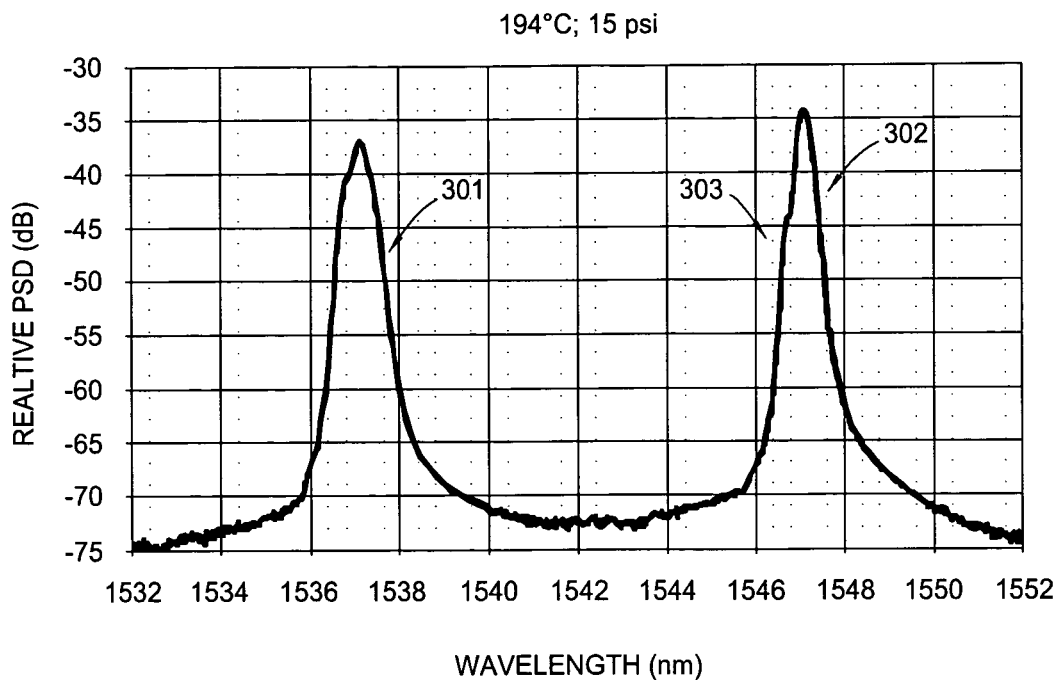
FIGS. 3-5 illustrate graphs of signals received from the diagnostic sensors where the feedthrough assembly is at a fixed temperature and different pressure for each graph.
Figure 4:
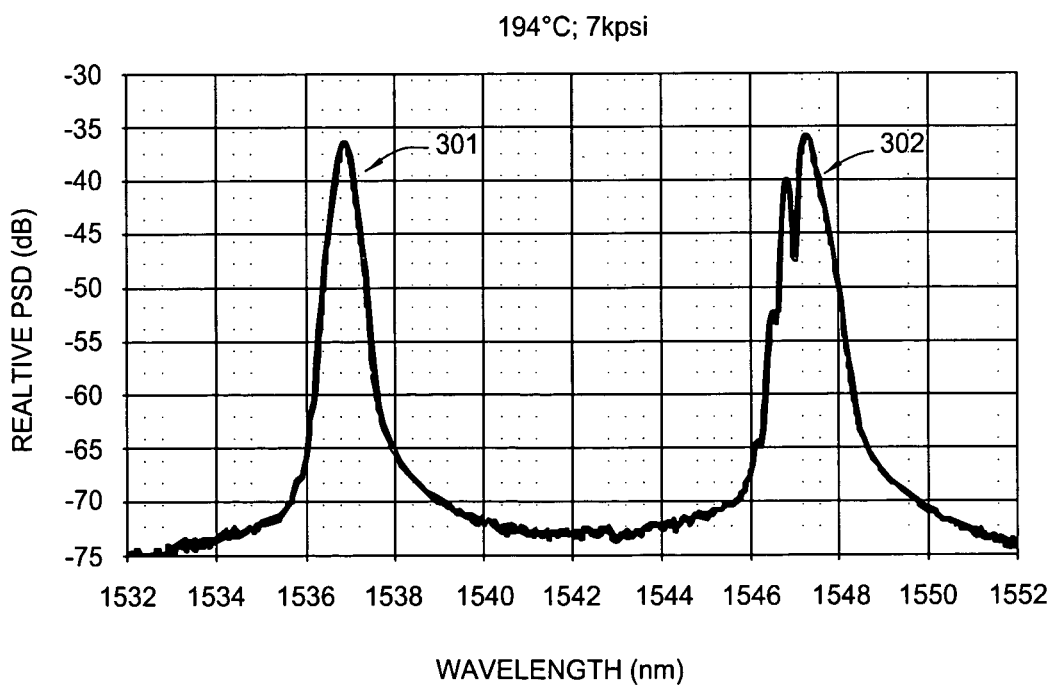
Figure 5:
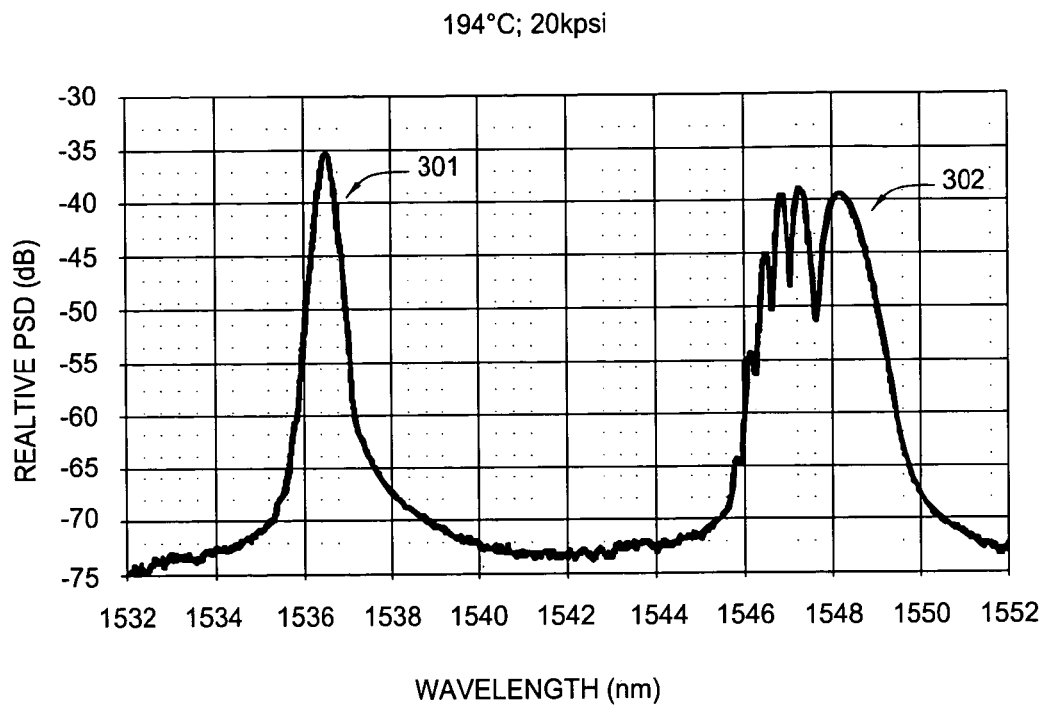

FIGS. 3-5 illustrate graphs of signals received from the diagnostic sensors 201, 202 where the feedthrough assembly 200 is at a fixed temperature but has different pressures introduced at end 224 for each graph. In all of the graphs herein, first sensor responses 301 correspond to signals received from the first sensor 201 while second sensor responses 302 correspond to signals received from the second sensor 202. In FIG. 3, an initial distortion or spreading of the second sensor response 302 visible specifically as a spectral chirp 303, providing positive feedback that preload of the glass plug 18 at the tapered surface 250 against the seat 251 has been established.

As visible in FIGS. 4 and 5, this distortion in the second sensor responses 302 grows relative to pressure due to non-uniform seal loads. However, the first sensor responses 301 show little change as pressure increases since uniform hydrostatic pressure dominates the first sensor 201. Additionally, the first sensor responses 301 provide an indication of a thermo-mechanical state of the housing of the feedthrough assembly 200 and a small pressure driven change in the preload of the plug 232.

Figure 6:
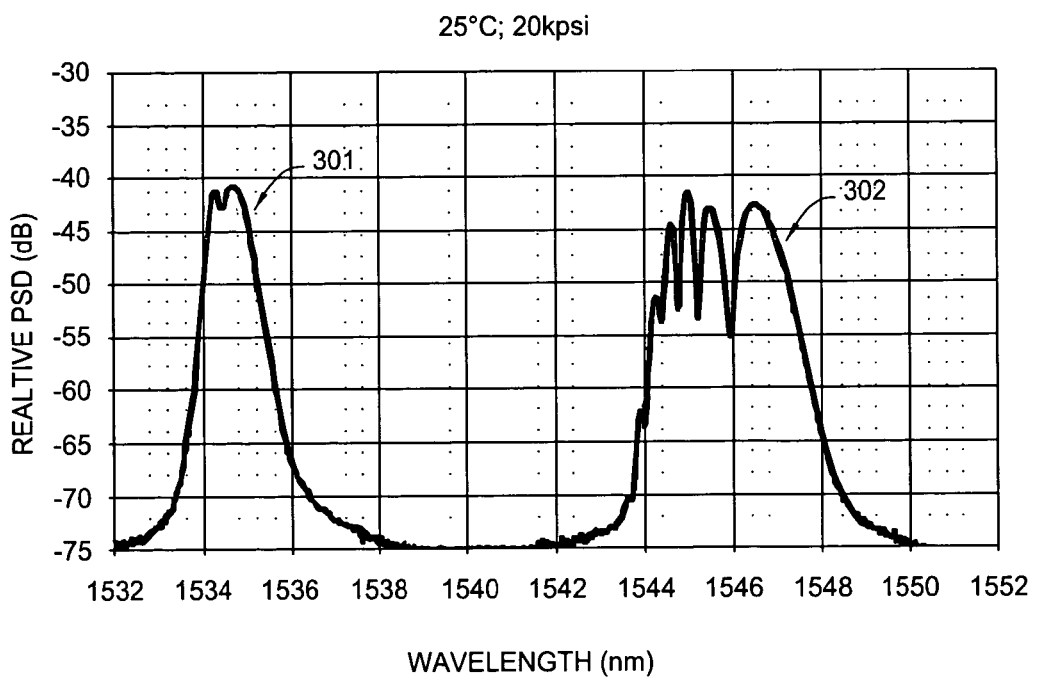
FIGS. 6-8 illustrate graphs of signals received from the diagnostic sensors where the feedthrough assembly is at a fixed pressure and different temperature for each graph.
Figure 7:
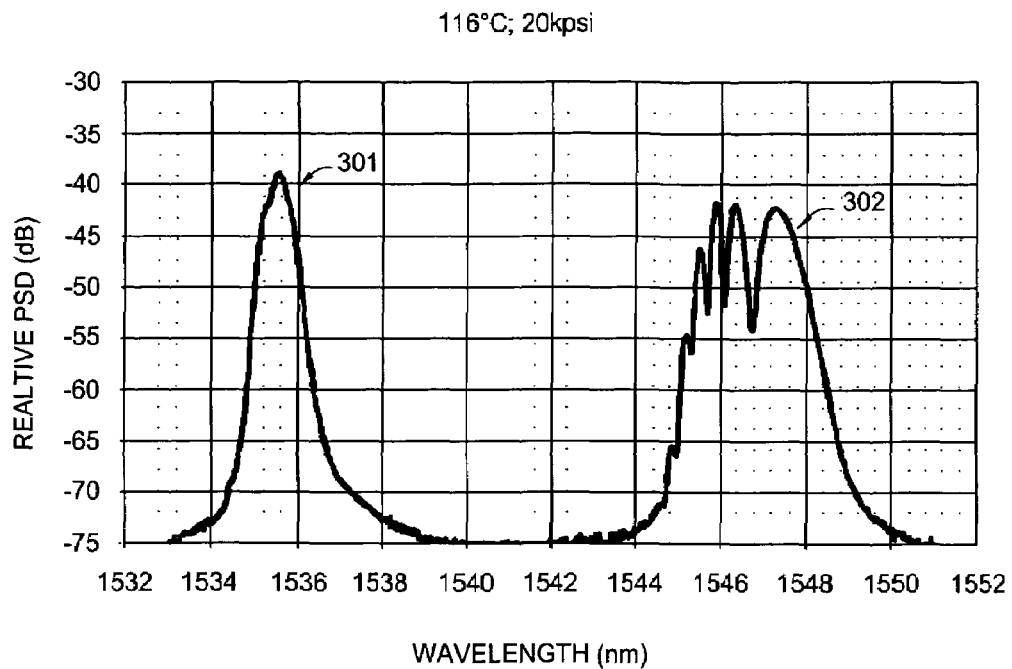
Figure 8:
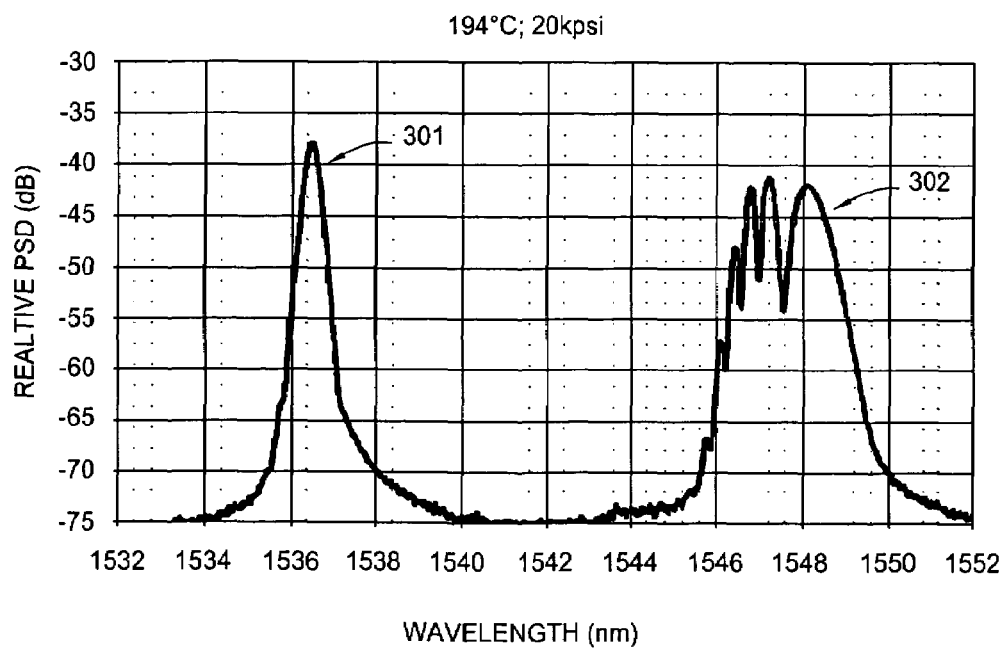

FIGS. 6-8 show graphs of signals received from the diagnostic sensors 201, 202 where the feedthrough assembly 200 is at a fixed pressure but is at a different temperature for each graph. The graphs show that as temperature increases both of the responses 301, 302 shift in wavelength relative to the temperature increase in the same direction. For example, the peak at approximately 1534.5 nanometers (nm) in the first responses 301 at 25° C. shifts to approximately 1536.5 nm at 194° C. Other than small changes from temperature driven changes in the preloads, shapes of the responses 301, 302 do not change with temperature changes.

With reference to FIG. 1, pressure entering the first end 22 of the passageway 16 may be significantly higher than the pressure entering the second end 24 of the passageway 16 in some applications. In this instance, if the higher pressure from the first end 22 exceeds a threshold value, then the seals formed by the seated tapered surface 50 of the glass plug 18 and/or the centering element 42 may be unseated. Accordingly, non-epoxy feedthrough assemblies in some embodiments can be adapted to seal against pressure from either side of a glass plug.

A Bi-Directional Seal Assembly

Figure 9:
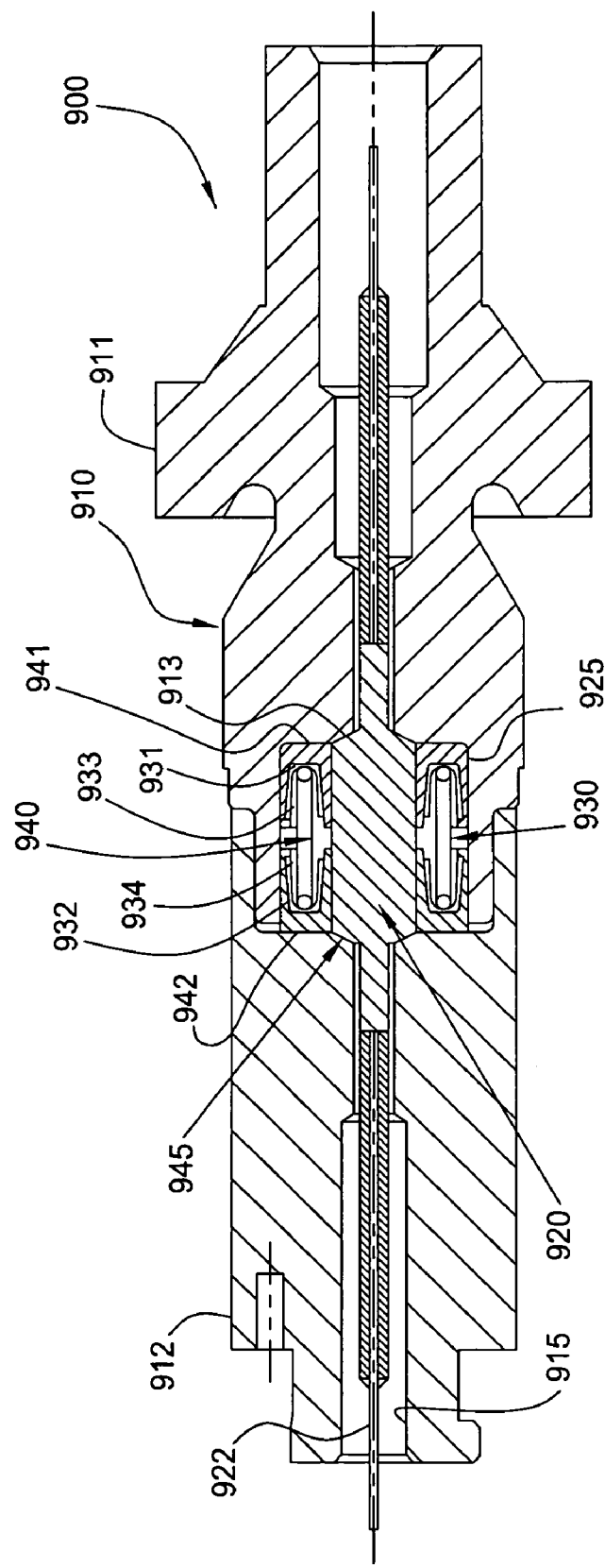
FIG. 9 illustrates a cross section view of an optical waveguide feedthrough assembly that provides bi-directional seal performance.

FIG. 9 shows an exemplary feedthrough assembly 900 having a bi-directional pressurized seal assembly 930. A cone shaped glass plug 920 is disposed in a recess 925 of a feedthrough housing 910 formed by two body sections 911, 912. The body sections 911, 912 can be coupled together using a weld or various other coupling configurations. A bore 915 sized to accommodate portions of an optical waveguide element 922 on either side of the glass plug 920 extends through the feedthrough housing 910. A tapered seat 913 can be formed on each body section 911, 912 for receiving the glass plug 920. Similar to the embodiment shown in FIG. 1, a gasket member 945 such as an annular gold foil can be disposed between the glass plug 920 and the tapered seats 913 of the body sections 911, 912. The symmetrical configuration of tapered seats 913 in sections 911, 912 creates the primary bidirectional seal design.

In one embodiment, a back-up bidirectional seal assembly 930 is disposed in the recess 925 to provide an additional seal against any leakage from either body section 911, 912. The seal assembly 930 includes two cup-shaped, annular sealing elements 931, 932 and a positioning device 940 to maintain the sealing elements 931, 932 in their respective seal seats 941, 942. The sealing elements 931, 932 are positioned such that their interior portions are opposed to each other and the positioning device 940 may be disposed in the interior portions of the sealing elements 931, 932. The positioning device 940 may comprise a preloaded spring to bias the sealing elements 931, 932 against their respective seal seats 941, 942, or against the body sections 911, 912. In one embodiment, the sealing elements 931, 932 are made of an elastomeric material. The sealing elements 931, 932 can also comprise other suitable flexible materials capable of withstanding high temperature and high pressure.

In operation, if fluid leaks through the tapered surfaces between the glass plug 920 and the first body section 911, then the fluid pressure forces the glass plug 920 against the tapered seat in the body section 912 to activate the reverse direction seal. The fluid pressure will also act against the second sealing element 932, which is biased against the second body section 912. Particularly, the fluid pressure acts on the interior portion of the second sealing element 932 and urges sealing lips 934 of the second sealing element 932 outward, thereby sealing off any fluid path between the second sealing element 932 and the glass plug 920 and between the second sealing element 932 and the body section 911. In this manner, the leaked fluid is prevented from entering the bore of the second body section 912 because of redundant seals.

Similarly, if fluid leaks through the tapered surfaces between the glass plug 920 and the second body section 912, then the fluid pressure forces the glass plug 920 against the tapered seat 913 in body section 911. The fluid pressure will also act against the first sealing element 931 biased against the first body section 911. In this respect, the fluid pressure causes sealing lips 933 of the first sealing element 931 to sealingly engage the glass plug 920 and the body section 911. Thus, the leaked fluid is prevented from entering the of bore of the first body section 911 because of redundant seals.

Feedthrough Assembly with Compression Bushing

Figure 10:
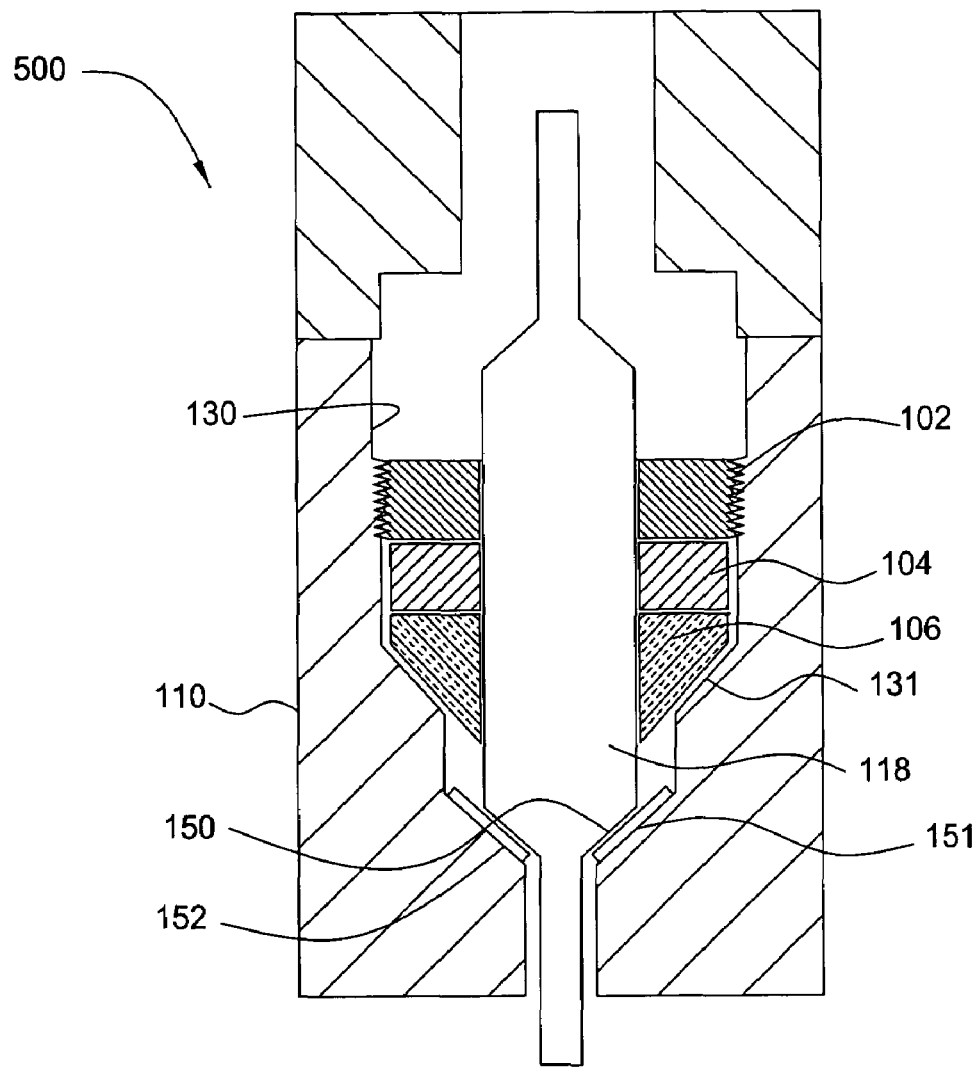
FIG. 10 illustrates a cross sectional view of an optical waveguide feedthrough assembly that includes a compression seal element.

FIG. 10 illustrates a cross sectional view of an optical waveguide feedthrough assembly 500 that includes a housing 110, an externally threaded bushing 102, a compression driver bushing 104, a compression seal element 106, and a glass plug 118 portion of an optical waveguide element that sealingly passes through the housing 110. The bushings 102, 104 and the seal element 106 are disposed adjacent to one another in a recess 130 in the housing 110 and encircle a portion of the glass plug 118. Specifically, the externally threaded bushing 102 threads into a portion of the recess 130 in the housing 110 defining mating internal threads. The seal element 106 is located next to the driver bushing 104 and proximate an inward tapering cone 131 along the recess 130 in the housing 110.

A seal can be established with the glass plug 118 with respect to the housing 110 by driving the seal element 106 down the cone 131. To establish this seal, rotation of the threaded bushing 102 with respect to the housing 110 displaces the threaded bushing 102 further into the recess 130 due to the threaded engagement between the threaded bushing 102 and the housing 110. The driver bushing 104 in turn moves further into the recess and pushes the sealing element 106 toward the cone 131. One function of the driver bushing 104 includes reducing torque transferred to the seal element 106 from the threaded bushing 102.

Preferably, the glass plug 118 has a cone shaped tapered surface 150 for seating against a complimentary tapered seat 151 of the housing 110. The engagement between the tapered surface 150 and the complimentary tapered seat 151 can also or alternatively seal off fluid communication through the housing 110 around the glass plug 118 in a redundant manner. A gasket member 152 such as an annular gold foil can be disposed between the tapered surface 150 of the glass plug 118 and the tapered seat 151 of the housing 110 to reduce stress risers.

Figure 11:
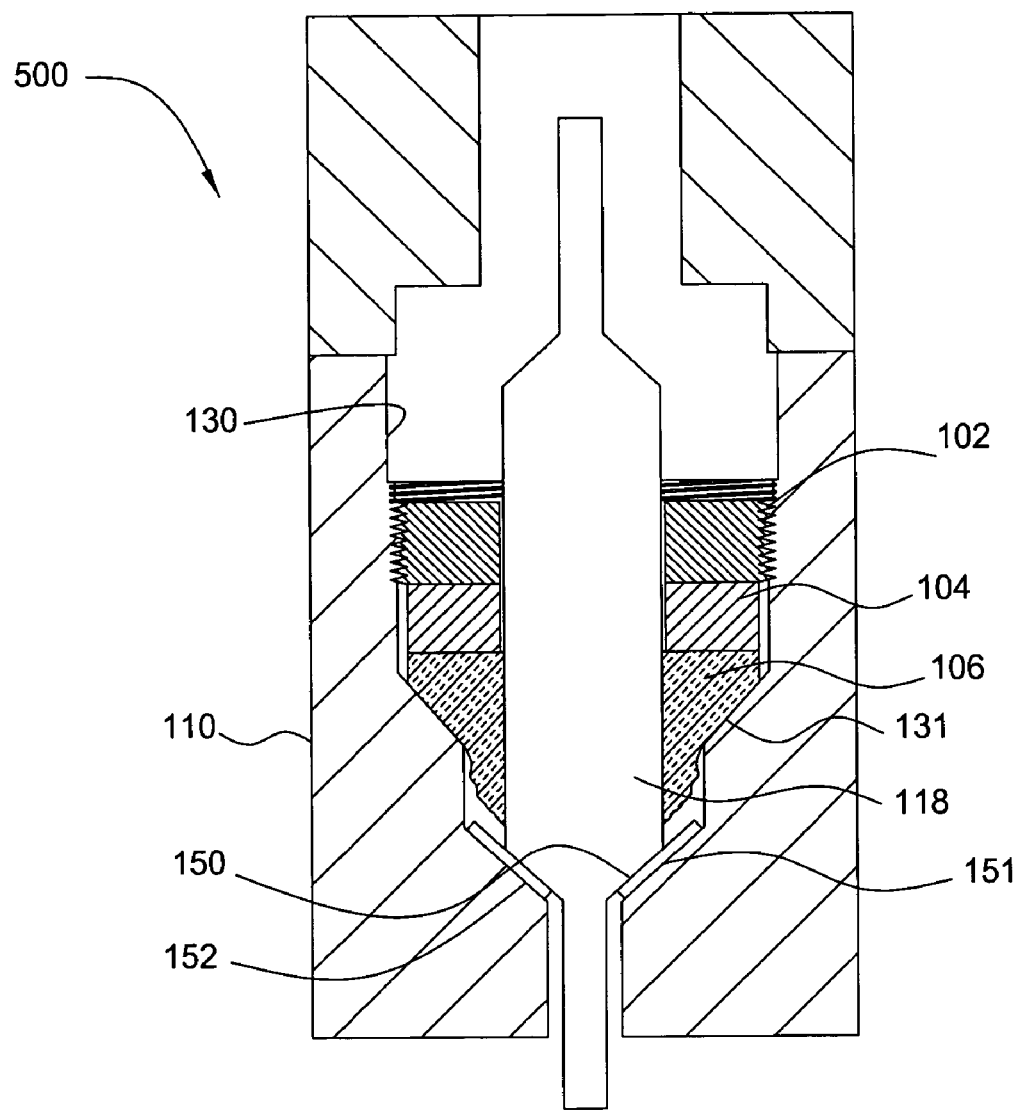
FIG. 11 illustrates the optical waveguide feedthrough assembly shown in FIG. 10 after compression of the compression seal element.

FIG. 11 illustrates the optical waveguide feedthrough assembly 500 after compressing the seal element 106. The seal element 106 packs within an annulus between an exterior of the glass plug 118 and an interior of the housing 110 after being driven down the cone 131. Once packed in the annulus, the seal element 106 provides sealing contact against both the glass plug 118 and the housing 110. Examples of suitable materials for the seal element 106 include TEFLON™, VESPEL™, polyimide, PEEK™, ARLON™, gold or other ductile metals for high temperature applications. During lower temperature usage, element 106 can be nylon, DELRIN™ or metal such as tin or lead. The driving of the seal element 106 can additionally move the glass plug 118 to force the tapered surface 150 to mate with the seat 151. The glass plug 118 is of sufficient diameter and structural integrity that the compression of the seal element 106 around the glass plug does not disturb the optical qualities thereof. The feedthrough assembly 500 is capable of sealing the glass plug 118 with respect to the housing 110 regardless of which side of the housing 110 is exposed to a higher pressure.

An Additional Exemplary Feedthrough Assembly

Figure 12:
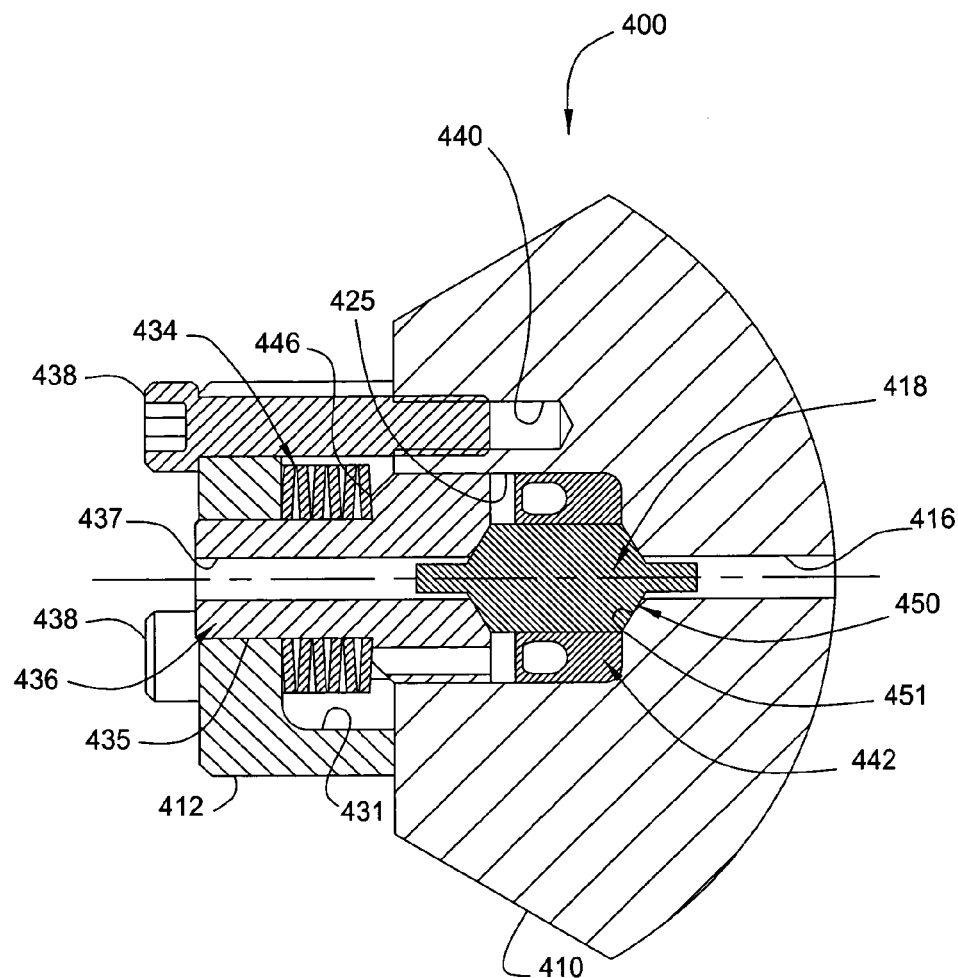
FIG. 12 illustrates a cross section view of another optical waveguide feedthrough assembly.

FIG. 12 shows a cross-section view of a feedthrough assembly 400 that includes a feedthrough housing 410 for retaining a glass plug 418. A recess 425 is formed in one end of the housing 410 to receive the glass plug 418. Preferably, the recess 425 has a corresponding tapered seat 451 for receiving a cone shaped tapered surface 450 of the glass plug 418. The glass plug 418 is preferably biased against the tapered seat 451 that is located along a bore 416 that connects to the recess 425 and provides a passageway through the housing 410.

In one embodiment, a fitting 436 having an axial bore 437 extending therethrough is disposed between the glass plug 418 and a washer cap 412. One end of the fitting 436 has a surface that mates with the glass plug 418 and an outer diameter that is about the same size as the inner diameter of the recess 425. In this respect, the fitting 436 assists with supporting the glass plug 418 in the recess 425. The other end of the fitting 436 has a neck 435 that connects to the washer cap 412. Particularly, a portion of the neck 435 fits in a hole of the washer cap 412. The washer cap 412 may be attached to the feedthrough housing 410 by any manner known to a person of ordinary skill in the art, such as one or more screws or bolts. For example, bolts 438 (two of three are visible in FIG. 12) may be used to attach the washer cap 412 to the feedthrough housing 410 via three screw holes 440 (only one is visible in FIG. 12) formed through the washer cap 412 and into the feedthrough housing 410.

The inner portion of the washer cap 412 facing the feedthrough housing 410 has a cavity 431 for retaining a preload member such as a spring. In one example, the preload member is a Belleville washer stack 434. The washer stack 434 may be disposed on the neck 435 of the fitting 436 and between the washer cap 412 and an outward shoulder 446 formed by a reduced diameter of the neck 435 of the fitting 436. In this manner, the washer stack 434 may exert a preloading force on the glass plug 418 to maintain a seal between the glass plug 418 and the tapered seat 451 of the feedthrough housing 410. Similar to the embodiments described above, a gasket member such as an annular gold foil (not shown) can be disposed between the glass plug 418 and the tapered seats 451 and/or the glass plug 418 and the fitting 436.

The feedthrough assembly 400 may further include a centering element 442 to act as a back-up seal. The centering element 442 comprises an elastomeric sealing component that is disposed between the glass plug 418 and the feedthrough housing 410. A pressure differential across the glass plug 418 advantageously causes the centering element 442 to deform and press against the wall of the recess 425 and the wall of the glass plug 418, thereby creating a pressure energized seal. Although the centering element 442 is described as providing a back up seal, the centering element 442 may be used independently to seal off the bore 416 of the feedthrough housing 410.

A First Exemplary Sensor Assembly

FIG. 13 shows a sensing assembly 1318 that includes a pressure sensor element 1310 disposed within a volume 1312 partially defined by a sensor housing 1314 that is filled with a first viscous fluid 1316 to essentially "float" the sensor element 1310 within the sensor housing 1314. The first viscous fluid 1316 "floats" the sensor element 1310 within the sensor housing 1314 providing fluid dampening to the sensor and allowing for uniform pressure distribution about the sensor element 1310. Sensing assembly 1318 further includes a pressure transmission device 1320, such as a bellows, disposed within a pressure housing 1324 and in fluid communication with the volume 1312. The pressure transmission device 1320 is exposed to a second viscous fluid 1325, which may be the same or different than the first viscous fluid 1316, having a first pressure P1 entering the pressure housing 1324 through an inlet 1326 from a source (not shown), such as an oil production tube. The pressure transmission device 1320 reacts to the first pressure P1 in the direction indicated by arrow 1321 and produces a corresponding second pressure P2 within the volume 1312. Further, the pressure transmission device 1320 may be configured to maintain the first viscous fluid 1316 in a relatively void free condition.

In some embodiments, the second fluid 1325 comprises those fluids typically encountered within an oil production well including oil, gas, water and air among others. The sensor housing 1314 is filled with the first viscous fluid 1316 such as a viscous fluid, grease, silicone oil, or other fluids that provide shock and/or vibration isolation and prevent the sensor element 1310 from violently contacting the inner walls of the housing when subject to shock or vibration. For some embodiments, the first viscous fluid 1316 is comprised of a silicone oil, such as Dow Corning 200 Fluid, having a nominal viscosity of 200 centistokes.

The pressure transmission device 1320 is shown in FIG. 13 as a bellows by way of example and may include any transmission or accumulator (or similar) device that effectively transmits the first pressure P1 to the volume 1312 while maintaining the volume 1312 in a fluid filled, void free, condition at the second pressure P2. A change in the first pressure P1 causes bellows 1320 to react in the direction of arrow 1321 changing the internal volume of the bellows and the pressure P2 within volume 1312 thereby. The bellows can have a maximum extension volume that maintains the second pressure P2 of the first viscous fluid 1316 at a predictable minimum quasi-hydrostatic pressure suspending the sensor element 1310 within the volume 1312 with an average gap 1328 between the sensor element 1310 and the sensor housing 1314.

The pressure sensor element 1310 is exposed to the second pressure P2 and transmits a signal corresponding to the level of pressure of the first viscous fluid 1316 via transmission cable 1330. In order to insure that the sensor element 1310 is free to float within the housing 1314, the transmission cable 1330 may be provided with a strain relief, or flexure portion 1331 which creates a low stiffness attachment between the sensor element 1310 and its base structure, the sensor housing 1314. Although shown as a loop, the flexure portion 1331 may comprise any configuration that relieves attachment strain to the sensor element 1310 such as a coil, serpentine arrangement, helix, or other similar flexible configuration.

The transmission cable 1330 passes through the sensor housing 1314 via a feedthrough assembly 1332 and is routed to other sensors or to an instrumentation or interrogation system (not shown). The feedthrough assembly 1332 can be any feedthrough assembly embodiment described above. The pressure sensor element 1310 may be any type of known optical pressure sensor benefiting from shock and vibration protection. When the sensor element 1310 is fiber optic based, the transmission cable 1330 may comprise one or more fiber optic cables.

Alternative Pressure Transmission Devices

FIGS. 14 and 15 show alternative embodiments of the pressure transmission device 1320. In FIG. 14, the pressure transmission device 1320 comprises a diaphragm that transmits the first pressure P1 to the volume 1312 while maintaining a fluid filled, void free, chamber. Referring to FIG. 15, the pressure transmission device 1320 comprises a pressure biased valve that transmits the first pressure P1 to the volume 1312. The valve is shown in an open position and is biased in a closed position (not shown) with a biasing force provided by a spring hinge 1337 that is overcome once the second pressure P2 reaches a predetermined minimum pressure. The valve is shown as pivoting in the direction of arrow 1338 between the open and closed positions but may comprise any known type of pressure biased valve such as a check valve, slide valve, duck's bill, or other similar type valve.

A Second Exemplary Sensor Assembly

FIG. 16 shows an alternative embodiment of a pressure sensing assembly 1318 including an inlet tube 1327 having an inside diameter 1329 exposed to a first pressure P1 and transmitting that pressure to a sensor housing 1314. In the embodiment shown, fluids 1325 and 1316 may be the same fluid and expose a sensor element 1310 to a second pressure P2 that is equal to the first pressure P1. For a given first fluid 1316 and a predetermined diameter 1329, a sufficient capillary force is provided within the inlet tube 1327 to preclude fluid flow between a pressure housing 1324 and the sensor housing 1314 below some minimum pressure threshold. Once a volume 1312 of the sensor housing 1314 is filled with the first fluid 1316 the capillary force provided by the inlet tube 1327 essentially prevents the flow of fluids between the sensor housing 1314 and the pressure housing 1324. In some embodiments, the inlet tube 1327 may be exposed directly to a source without the pressure housing 1324 being intermediate. It is advantageous to minimize flow in and out of the sensor housing 1314 in the directions indicated by arrows 1334, 1336. For this, as well as for other reasons, a buffer tube 1333 is coupled to an inlet 1326.

The sensor housing 1314 includes a pass through arrangement. A transmission cable 1330 enters the sensor housing 1314 on one end and is coupled to the sensor element 1310. An exit transmission cable 1360 is similarly coupled to the sensor element 1310 and exits the sensor housing 1314 via a feedthrough assembly 1332. The pass through arrangement allows multiplexing of a plurality of the sensor assemblies 1318 wherein the transmission cables 1330, 1360 are similarly connected to other sensors. Alternatively, one or both, of the transmission cables 1330, 1360 may be connected to a signal processing system (not shown).

A Third Exemplary Sensor Assembly

Figure 17:
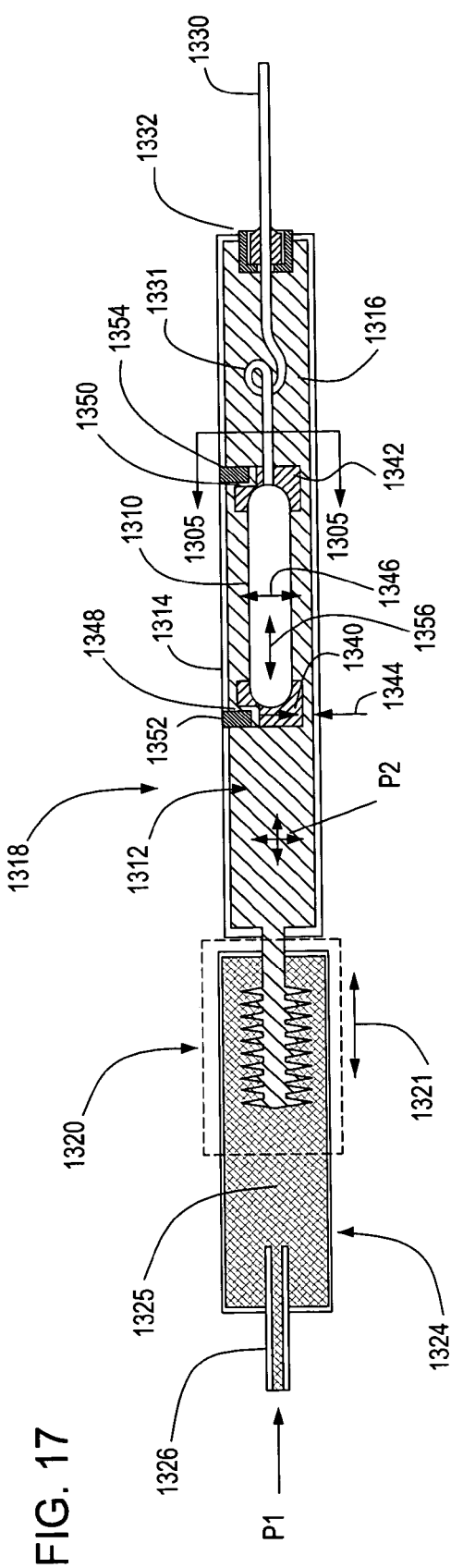
FIG. 17 illustrates a side cross section view of a second alternative embodiment of a pressure sensor assembly.
Figure 18:
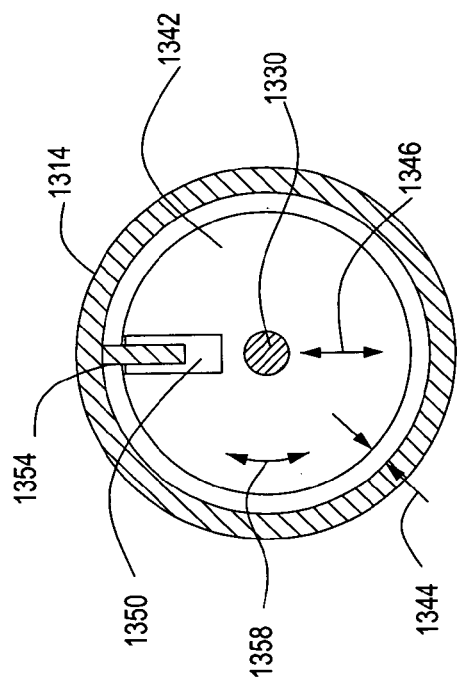
FIG. 18 illustrates a cross sectional view of the pressure sensor assembly of FIG. 17 taken substantially along line 5-5.

FIGS. 17 and 18 show a sensing assembly 1318 including bumper elements 1340, 1342 that are attached to and extend beyond the dimensions of a sensor element 1310 to prevent the sensor element 1310 from directly contacting a sensor housing 1314. The bumper elements 1340, 1342 may be comprised of a suitable material, such as polyamide, epoxy, polymers, elastomers, TEFLON™, VITON™, for example, and are sized to provide a predetermined clearance 1344 between the bumpers and the sensor housing 1314 allowing the sensor element 1310 to float radially in the direction indicated by arrow 1346 within the housing and within the clearance dimension.

Features further limit the motion of the sensor element 1310 in a rotational and translational direction. The bumper elements 1340, 1342 include slots 1348, 1350 that cooperate with housing mounted tangs 1352, 1354 to limit the translational movement of the sensor element 1310 in the direction indicated by arrow 1356 and further limits rotational movement of the sensor element 1310 in the direction indicated by arrow 1358. The bumpers 1340, 1342, and slots 1348, 1350 allow the sensor element 1310 to float within a volume 1312 within a limited envelope determined by the gaps between the bumpers and the sensor housing 1314 and the gaps between the tangs 1348, 1350 and the slots.

Limiting the radial motion of the sensor element 1310 prevents the sensor element from contacting the sensor housing 1314 directly. Limiting the translational movement of the sensor element 1310 reduces the amount of strain relief 1331 needed to allow for float and further prevents the sensor element 1310 from directly contacting the ends of the sensor housing 1314. Further, limiting the rotational envelope of the sensor element 1310 prevents the sensor element from spinning within the volume 1312 and further reduces problems spinning would create with the transmission cable 1330 and its attachment to the sensor element.

For some embodiments, bumpers are mounted to the housing 1314 to limit the movement of the sensor element 1310 within the volume 1312 similar to that described herein with reference to sensor mounted bumpers. The bumpers can include a pair of grooves to cooperate with a pair of tangs in any radial arrangement about the sensor housing. Further, the bumpers 1340, 1342 fill the volume 1312 to advantageously reduce the amount of a first fluid 1316 therein.

A Fourth Exemplary Sensor Assembly

Figure 19:
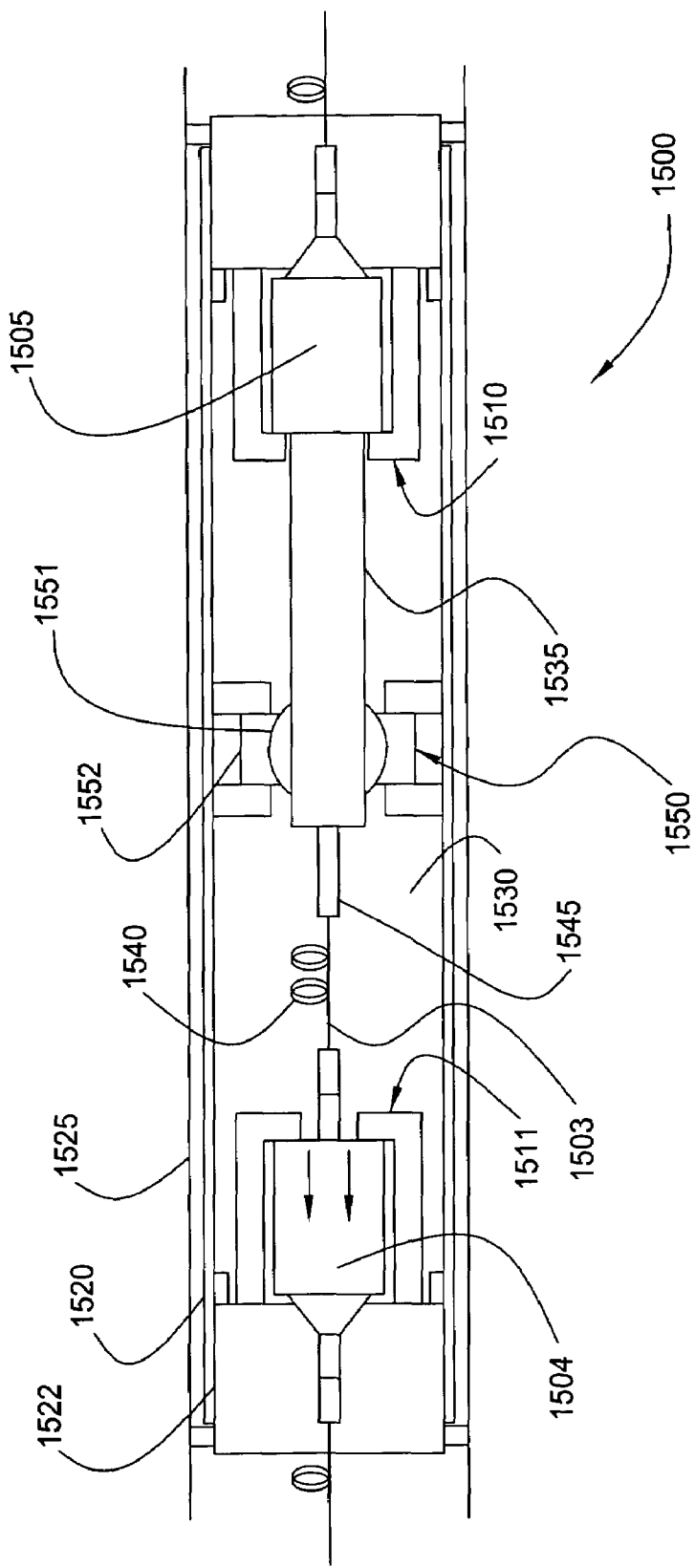
FIG. 19 illustrates a side cross section view of a third alternative embodiment of a pressure sensor assembly.

FIG. 19 illustrates another embodiment of a pressure transducer subassembly 1500 having feedthrough assemblies 1510, 1511 that utilize glass plugs 1504, 1505 as described above. The subassembly 1500 includes the feedthrough assemblies 1510, 1511 coupled to splits 1522 of a collar 1520 to form a sealed fluid chamber 1530. A housing 1525 is attached to the feedthrough assemblies 1510, 1511. A sensor element 1535 can be connected directly to the glass plug 1505 of the feedthrough assemblies 1510. The other end of the sensor element 1535 is cantilever mounted to the collar 1520. In this respect, the sensor element 1535 is isolated from the housing 1525.

In one embodiment, the sensor element 1535 is mounted to the collar 1520 using a ball joint 1550. The ball joint 1550 comprises a ball 1551 coupled to a tracking device, such as a washer 1552. The ball 1551 can have a hole for receiving the sensor element 1535. The ball 1551 is supported by the washer 1552 that is coupled to the collar 1520 and is locked in a neutral position. The ball joint 1550 advantageously limits deflection of the sensor element 1535 that is cantilevered. To reduce the strain on the sensor element 1535, a service loop 1540, a flexible carrier 1545, or combinations thereof may be utilized for connection of the sensor element 1535 to an optical fiber 1503.

A Fifth Exemplary Sensor Assembly

Figure 20:
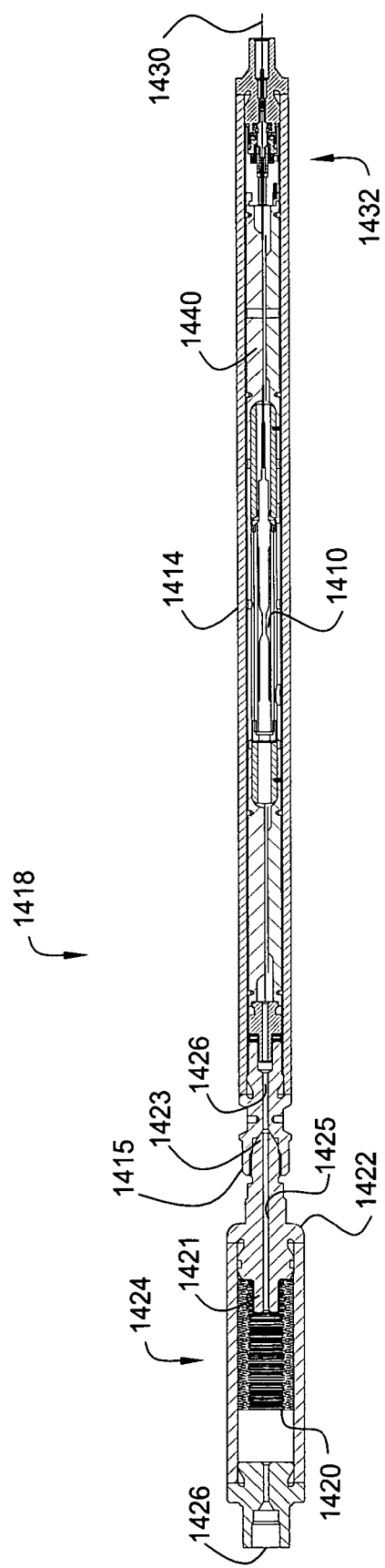
FIG. 20 illustrates a side cross section view of a fourth alternative embodiment of a pressure sensor assembly.

FIG. 20 shows a pressure sensor assembly 1418 having an optical pressure sensor element 1410 disposed within a sensor housing 1414 that is filled with a fluid. A bellows 1420 is disposed within a pressure housing 1424 and has an inner volume in fluid communication with an interior of the sensor housing 1414. The bellows 1420 is exposed to a fluid pressure entering the pressure housing 1424 through an inlet 1426 that is coupled to a source (not shown). Since the pressure sensor assembly 1418 operates similar to other embodiments described above, a detailed discussion of the operational particulars of the pressure sensor assembly 1418 is omitted.

An optical transmission cable 1430 is coupled to a feedthrough assembly 1432, which is illustrated as the feedthrough assembly that is shown in detail in FIG. 1. For some embodiments, the feedthrough assembly 1432 can be any other feedthrough assembly embodiment described above. Accordingly, the feedthrough assembly 1432 provides optical communication between the transmission cable 1430 and the sensor element 1410.

Clam shell members 1440 hold the sensor element 1410 in position within the sensor housing 1414 and aid in filling an interior volume of the sensor housing. Annular passages between the clam shell members 1440 and the sensor housing 1414, transverse apertures in the clam shell members 1440 and/or internal longitudinal passages defined by the claim shell members 1440 provide fluid communication between an interior of the bellows 1420 and the sensor element 1410 that detects pressure changes caused by expansion/compression of the bellows 1420.

The pressure housing 1424 includes a base 1422 that the bellows 1420 are coupled to. Preferably, the bellows 1420 are welded to the base 1422 around a reduced diameter protrusion 1421 of the base 1422 that aids in alignment of the bellows 1420 with the base 1422. A longitudinal bore 1425 through the base 1422 opens into the interior of the bellows 1420. A male end 1423 of the base 1422 of the pressure housing 1424 is threaded into a female end 1415 of the sensor housing 1414. The male end 1423 can include a conical tapered surface for mating with a corresponding conical tapered surface of the female end 1415. The tapered surfaces facilitate alignment of the bore 1425 in the base 1422 of the pressure housing 1424 with a channel 1426 extending into the interior of the sensor housing 1414. A weld (not shown) circumscribing the male end 1423 at a junction between the male and female ends 1423, 1415 can seal the interior of the bellows 1420 and the interior of the sensor housing 1414 from a surrounding fluid environment. Alternatively, the male and female ends 1423, 1415 can be reversed for some embodiments.

As described herein, pressure transducer assemblies having a non-epoxy feedthrough assembly are provided for operation in high temperature and high pressure environments. The invention heretofore can be used and has specific utility in applications within the oil and gas industry. Further, it is within the scope of the invention that other commercial embodiments/uses exist with one such universal sealed sensor arrangement shown in the figures and adaptable for use in (by way of example and not limitation) industrial, chemical, energy, nuclear, structural, etc. Although the sensors described heretofore detect pressure, other environmental conditions may be detected by optical elements, such as Bragg grating based sensors, disposed and arranged within a housing for detection of seismic disturbances, chemicals, etc., as is well known in the art.

It should be understood that, unless otherwise stated herein, any of the features, characteristics, alternatives or modifications described regarding a particular embodiment herein may also be applied, used, or incorporated with any other embodiment described herein. While the foregoing is directed to preferred embodiments of the invention, other and further embodiments of the invention may be devised without departing from the basic scope thereof, and the scope thereof is determined by the claims that follow.

We claim:

1. A sensor assembly, comprising:
   a sensor housing;
   an optical sensing element disposed in the sensor housing; and
   an optical waveguide feedthrough assembly comprising a waveguide element having a plug portion that has a larger outer diameter relative to another portion of the waveguide element and is sealingly engaged with the sensor housing, the plug portion having a first end spliced to and in optical communication with an optical transmission cable outside of the housing and a second end spliced to and in optical communication with the sensing element.

2. The sensor assembly of claim 1, further comprising an additional feedthrough assembly with the sensor assembly configured in a pass-through configuration.

3. The sensor assembly of claim 1, wherein the sensing element is suspended in a fluid contained within the sensor housing.

4. The sensor assembly of claim 1, wherein the sensing element is cantilever mounted inside the sensor housing.

5. A pressure sensor assembly for measuring a pressure of a fluid, comprising:
   a sensor housing containing the fluid, the sensor housing having a bore extending from outside of the sensor housing to inside of the sensor housing;
   an optical based pressure sensing element disposed in the fluid and in optical communication with a plug portion of an optical waveguide element, wherein the plug portion is sealed within the bore and in optical communication with an optical transmission cable disposed outside of the sensor housing; and
   a pressure transmission device in contact with the fluid for transmitting pressure to the fluid, wherein the pressure transmission device comprises a pressure housing surrounding a bellows, are wherein the pressure housing is coupled to the sensor housing and the bellows are coupled to a base of the pressure housing, the base having a male end with a conical tapered surface threaded to a female end of the sensor housing with a corresponding conical tapered surface.

6. The assembly of claim 5, wherein the bore includes a tapered seat located along a length thereof for mating with a complementary tapered surface of the plug portion.

7. The assembly of claim 6, further comprising an annular gasket member disposed between the tapered seat and the complementary tapered surface of the plug portion.

8. The assembly of claim 6, further comprising a biasing member for biasing the plug portion against the housing to force the tapered surface of the plug portion to mate with the seat.

9. The assembly of claim 5, further comprising a bi-directional sealing element disposed between the sensor housing and the plug portion.

10. The assembly of claim 6, further comprising at least one sensor disposed in the plug portion proximate the tapered surface thereof.

11. A pressure sensor assembly for measuring a pressure of a fluid, comprising:
   a sensor housing containing the fluid;
   an optical based pressure sensing element disposed in the fluid and in optical communication with a plug portion of an optical waveguide element, wherein the plug portion is sealed with respect to the housing and in optical communication with an optical transmission cable disposed outside of the sensor housing;
   a pressure transmission device in contact with the fluid for transmitting pressure to the fluid; and
   at least one sensor disposed in the plug portion for providing diagnostic signals indicating that a seal is established with respect to the plug portion and the sensor housing.

12. The assembly of claim 11, wherein the at least one sensor includes a first and second sensor for providing signals indicative of temperature and pressure at the plug portion.

13. The assembly of claim 11, wherein the at least one sensor includes a first and second sensor, the first sensor located proximate where the seal is established.

* * * * *